Figure 1:
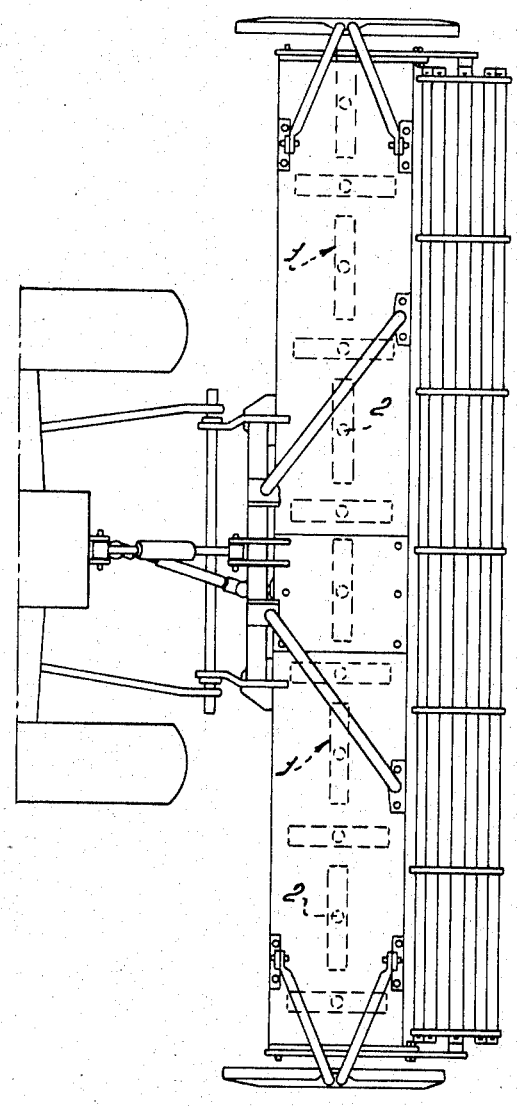

United States Patent [19]
van der Lely et al.

[11] 3,809,166
[45] May 7, 1974

[54] TINE MOUNTINGS

[76] Inventors: Cornelis van der Lely, 7 Bruschemain, Zug, Switzerland; Ary van der Lely, 10 Weverskade, Maasland, Netherlands

[22] Filed: Jan. 18, 1972

[21] Appl. No.: 218,667

[30] Foreign Application Priority Data
- Jan. 19, 1971 Netherlands.................... 7100672
- Mar. 1, 1971 Netherlands.................... 7102669
- Aug. 31, 1971 Netherlands.................... 7111947

[52] U.S. Cl.................................. 172/763, 172/59
[51] Int. Cl.............................................. A01b 15/00
[58] Field of Search............ 172/762, 763, 112, 753, 172/681, 691, 765

[56] References Cited
UNITED STATES PATENTS
| | | | |
|---|---|---|---|
| 2,582,364 | 1/1952 | Tice | 172/112 X |
| 1,219,107 | 3/1917 | Jones | 172/763 X |
| 3,657,785 | 4/1972 | Vissers | 172/762 X |
| 485,020 | 10/1892 | Sobey | 172/763 X |
| 511,039 | 12/1893 | Bowen | 172/763 |

FOREIGN PATENTS OR APPLICATIONS
| | | | |
|---|---|---|---|
| 264,178 | 4/1966 | Austria | 172/763 |
| 1,167,083 | 12/1962 | Germany | 172/762 |

Primary Examiner—Robert E. Pulfrey
Assistant Examiner—R. T. Rader
Attorney, Agent, or Firm—Mason, Mason & Albright

[57] ABSTRACT

A cultivator tine mounting includes an elongated support that rotates about a central axis with tine holder holes at each end of the support. The holes are surrounded by upper and lower surfaces which can be configured to seat the upper fastening portions of a tine with securing means, retaining the tine in fixed relationship with the support. A stiffener element or deformation of the support can be located near the holes for additional support. The support can be hollow and made of two sheet metal interengaging parts. Also the tine holders can be vertically extending members that are attached to the remainder of the support.

7 Claims, 21 Drawing Figures

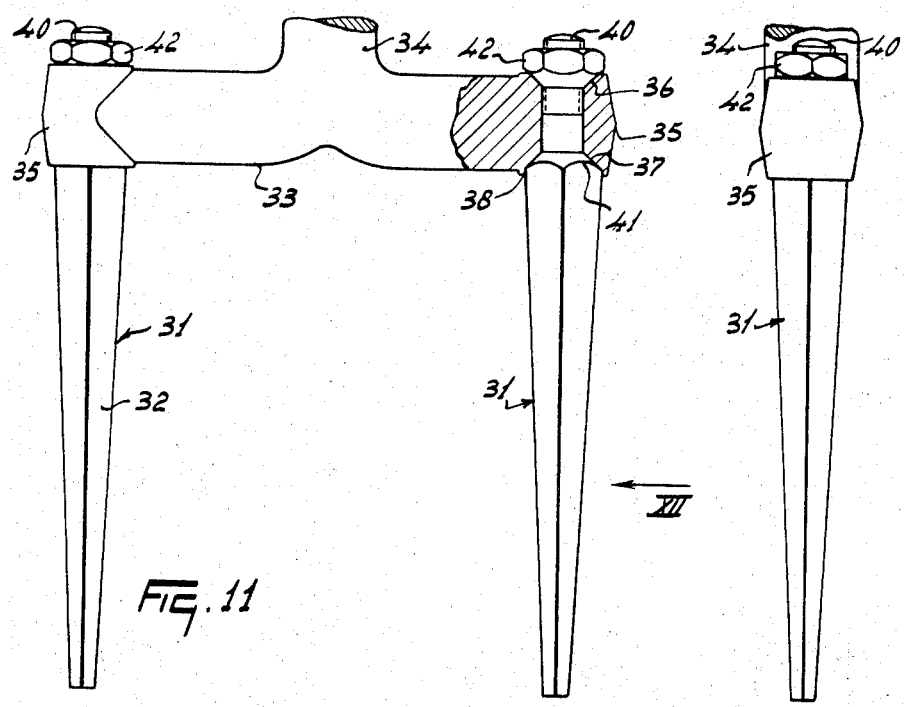
FIG. 11
FIG. 12
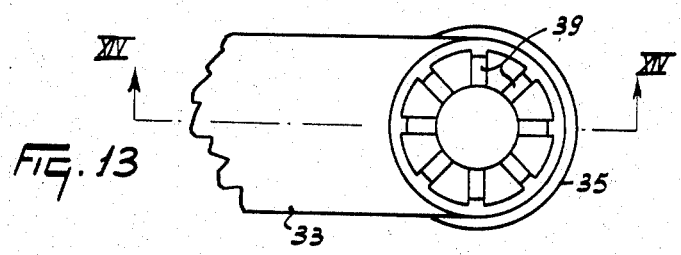
FIG. 13
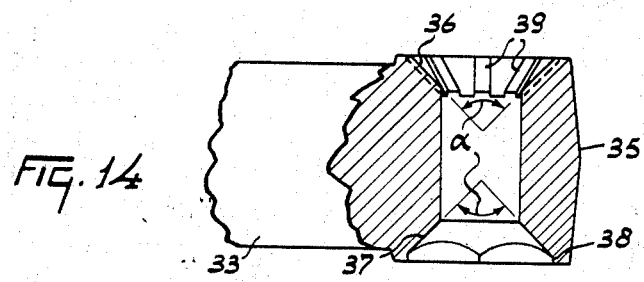
FIG. 14

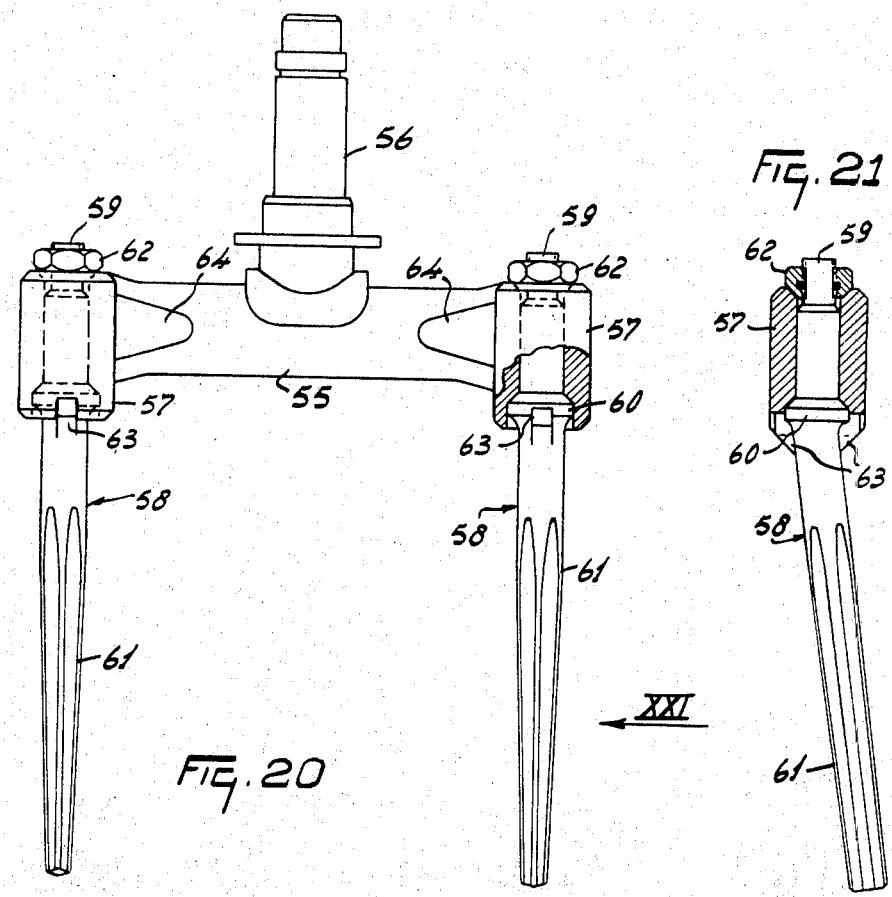

TINE MOUNTINGS

Strong resistance to their passage through the soil is often encountered by the tines of such cultivators and, accordingly, known cultivators of this kind generally have their tines fastened in position by complicated and relatively expensive means. It is an object of the invention to reduce the complication and expense while providing strong and reliable tine mountings.

According to the invention there is provided a tine mounting intended for use in a cultivator of the kind set forth, wherein the corresponding support is substantially horizontally disposed and is provided, spaced apart from its axis of rotation, with at least one tine holder, and wherein the or each tine holder is adapted to receive a fastening portion of a corresponding tine and the or each fastening portion is provided with securing means at or near its upper end.

Figure 2:
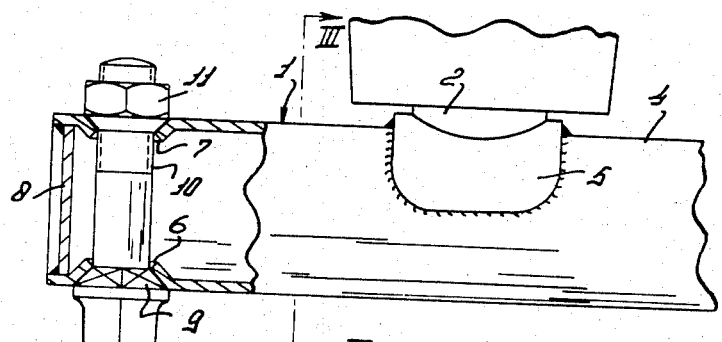
Figure 3:
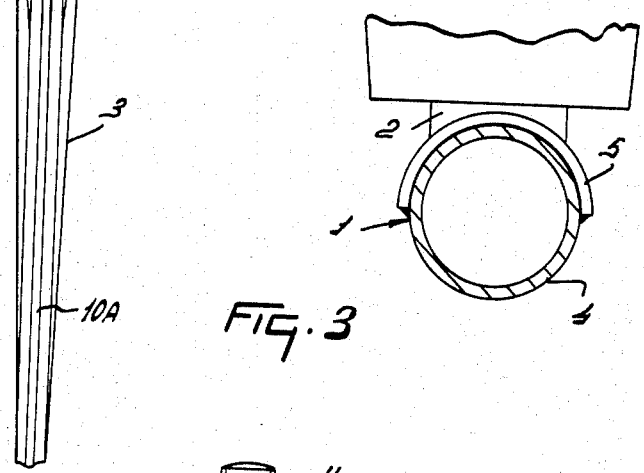
Figure 4:
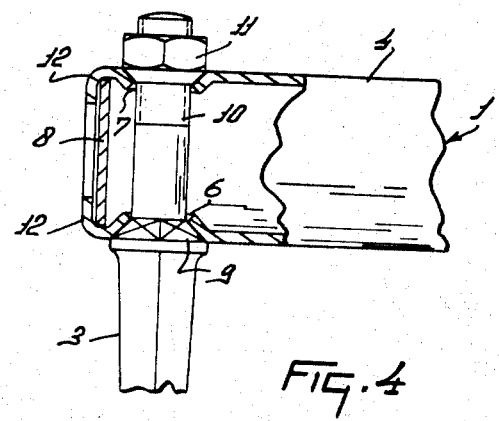
Figure 6:
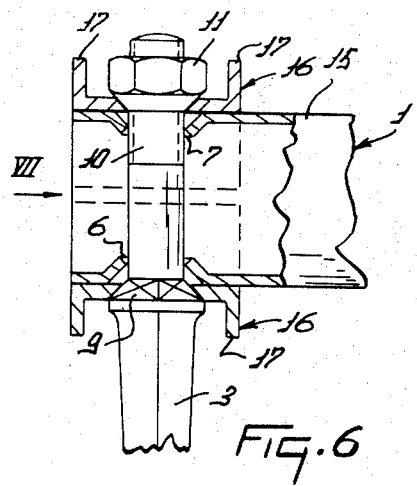
Figure 7:
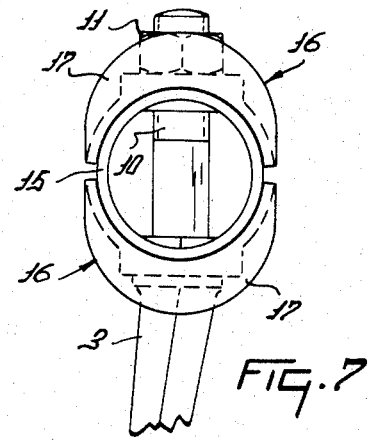
Figure 5:
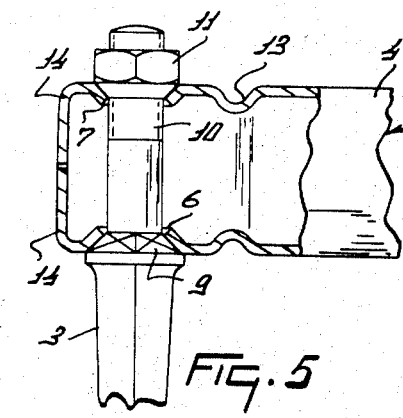
Figure 8:
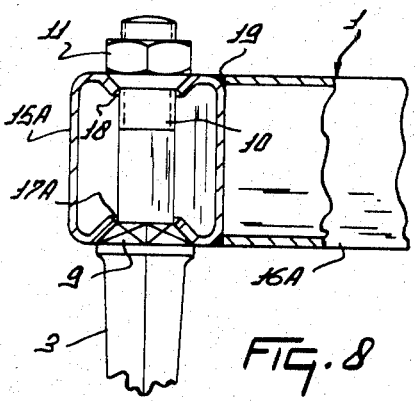
Figure 9:
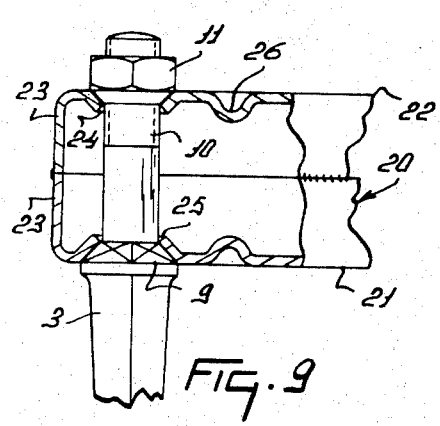
Figure 10:
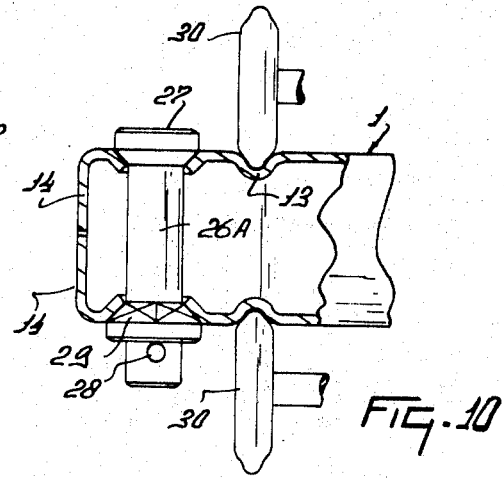
Figure 15:
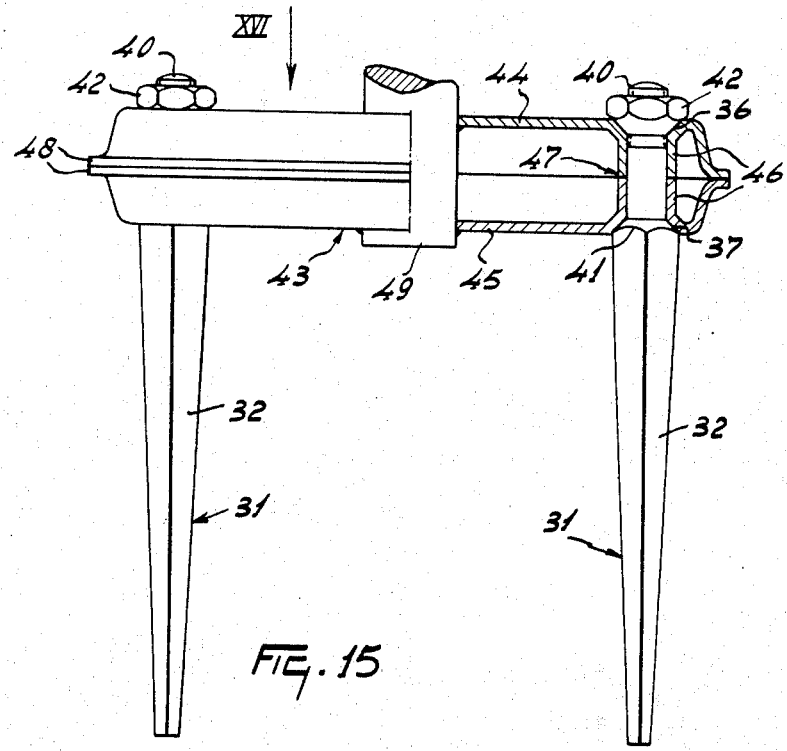
Figure 16:
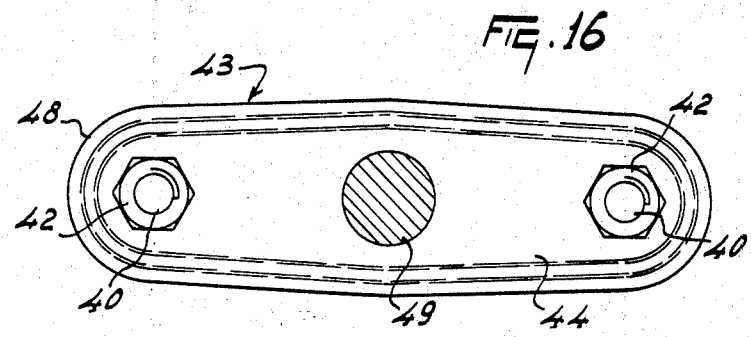
Figure 17:
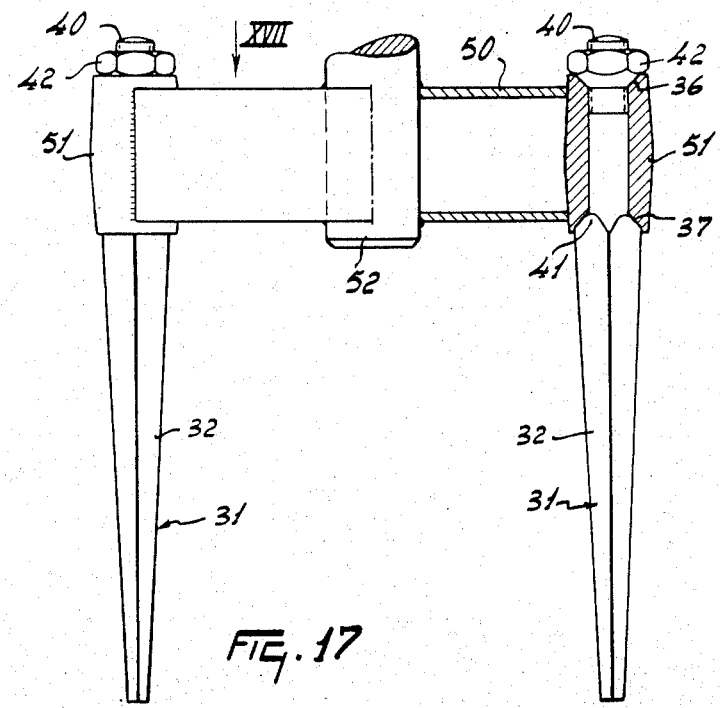
Figure 18:
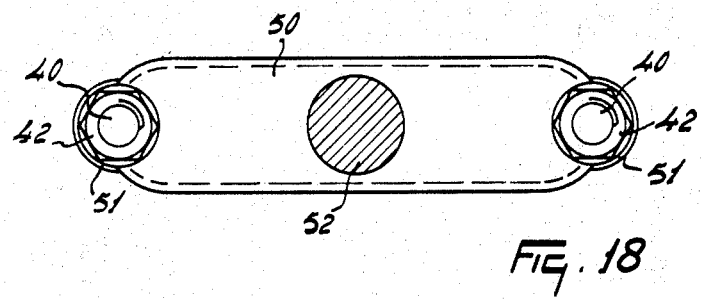
Figure 19:
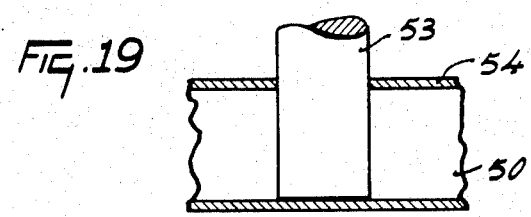

For a better understanding of the invention, and to show how the same may be carried into effect, reference will now be made, by way of example, to the accompanying drawings, in which:

FIG. 1 is a plan view of a soil cultivating implement or cultivator whose rotary soil working members have tines that are fastened in position in accordance with the invention, FIG. 2 is a part-sectional elevation, to an enlarged scale, showing details of the construction of one of the soil working members of the cultivator of FIG. 1, FIG. 3 is a section taken on the line III-III of FIG. 2, FIGS. 4, 5 and 6 substantially correspond to the sectional portion of FIG. 2 but show alternative forms of tine mounting, FIG. 7 is a view as seen in the direction indicated by an arrow VII in FIG. 6, FIGS. 8 and 9 correspond to FIG. 5 but show alternative constructions, FIG. 10 diagrammatically illustrates the manufacture of a tine support, FIG. 11 is a part-sectional elevation, to a reduced scale, which substantially corresponds to FIG. 2 but shows an alternative soil working member construction, FIG. 12 is a view as seen in the direction indicated by an arrow XII in FIG. 11, FIG. 13 is a scrap plan view illustrating part of an alternative form of soil working member and particularly a tine holder thereof, FIG. 14 is a section taken on the line XIV—XIV of FIG. 13, FIG. 15 corresponds to FIG. 11 but shows a further alternative soil working member construction, FIG. 16 is a plan view as seen in the direction indicated by an arrow XVI in FIG. 15, FIG. 17 corresponds to FIGS. 11 and 15 and shows a further alternative soil working member construction, FIG. 18 is a plan view as seen in the direction indicated by an arrow XVIII in FIG. 17, FIG. 19 is a scrap sectional elevation illustrating an alternative way of fastening a tine support to a shaft affording the axis of rotation of a soil working member, FIG. 20 corresponds to FIGS. 11, 15 and 17 but shows a further alternative construction, and FIG. 21 is a part-sectional elevation as seen in the direction indicated by an arrow XXI in FIG. 20.

The soil cultivating implement or cultivator that is shown in FIG. 1 of the drawings mounted at the rear of an agricultural tractor has a row of twelve soil working members 1 that extends substantially horizontally perpendicular to the intended direction of operative travel of the cultivator which is from right to left as seen in FIG. 1. The soil working members 1 are in neighbouring side by side relationship and each of them is rotatable about an upright axis that is afforded by a corresponding shaft 2 which will normally be vertically or substantially vertically disposed. The lowermost end of each shaft 2 is provided with a corresponding tine support 4 that is substantially horizontally disposed and the opposite ends of which carry a pair of diametrically opposed tines 3. The tine support 4 is afforded by a tube of circular cross-section in the embodiment of FIGS. 1 to 3 of the drawings but the tube could be of oval or angular cross-section if preferred. The connections between the shafts 2 and the tine supports 4 are afforded by wrought iron brackets 5 each of which is of substantially semi-cylindrical formation so that it embraces an upper central region of the corresponding support tube 4 throughout substantially 180°, rigid connections between the brackets 5 and supports 4 being established by welding. The construction of the brackets 5 enables the supports 4 to be secured thereto in a simple, rapid and effective manner.

Lower holes 6 and upper holes 7 are punched through the tine supports 4 adjacent the opposite ends thereof to afford tine holders, the inwardly bent over edge regions of the holes 6 and 7 being deformed to provide tapered supporting surfaces. Stiffeners 8 are provided just inside the opposite ends of the tubular tine supports 4, each stiffener 8 being plate-like in formation, having a shape which conforms with the cross-sectional shape of the corresponding support 4, and being disposed so as to extend substantially perpendicular to the longitudinal axis of that support. Each stiffener 8 is retained in its appointed position by a number of spot welds along upper and lower portions of its edge. An upper fastening portion of each tine 3 is provided with a collar 9 that is of upwardly tapering formation presenting a plurality of relatively inclined trapezoidal surfaces of which it is preferred that there should be four. These surfaces bear upon the aforementioned tapering surfaces afforded by the inwardly bent over edge region of the lower hole 6. A short upper end region of each tine 3 is formed with a screw thread 10 and this portion extends through the corresponding upper hole 7. The screw threaded portion 10 is provided with a nut 11 having a downwardly directed conical surface. When the nut 11 is tightened, the conical surface thereof co-operates with the conical surface afforded by the edge region of the upper hole 7, the neighbouring stiffener 8 acting at one side of the two holes 6 and 7 to prevent deformation of the support 4 even when the nut 11 is very firmly tightened. The upper fastening portion of the tine 3 normally extends substantially vertically but a lower soil working portion 10A thereof is inclined to the upper fastening portion by an angle of substantially 8°, the tine 3 being formed with an integral bend or junction between these two portions at a location beneath the collar 9. This bend or junction is not visible in FIG. 2 of the drawings but a corresponding construction can be seen in FIGS. 7 and 21 thereof.

The trapezoidal surfaces of the collar 9 will normally be arranged to co-operate with the supporting surfaces of the edge region of the lower hole 6 in such a way that the soil working portion 10A of the tine 3 trails rearwardly with respect to the intended direction of rotation of the soil working member 1 that is concerned. However, there are working conditions under which a better result is achieved when the portions 10A lead with respect to the intended direction of rotation and the tines 3 can readily be re-arranged in these positions by temporarily loosening the nuts 11 and turning the fastening portions of the tines through 180° in their holders before retightening the nuts.

FIG. 4 of the drawings shows a construction in which the stiffeners 8 are retained in position between the oppositely bent over edge regions of the lower and upper holes 6 and 7 and inwardly bent over end regions 12 of the tine supports 4. It can be seen from FIG. 4 of the drawings that the stiffeners 8 are trapped in their appointed positions between the various deformed portions of the tubular supports 4 that have just been mentioned and it will be realised that any slight freedom of movement that the stiffeners 8 may have after they are first placed in their appointed positions will be eliminated once the nuts 11 are tightened thus causing a small degree of resilient deformation of the ends of the metallic tubular supports 4.

FIG. 5 of the drawings shows an alternative construction in which an annular groove 13 is punched in the tubular tine support 4 in close proximity to the tine holder but at the opposite side of the tine holder to the free end of the support. The term "close proximity" is to be interpreted as meaning a distance from the nearest points on the edges of the holes 6 and 7 which is not greater than the diameters of those holes, it being preferred that said distance should not exceed five millimeters. The annular groove 13 affords a stiffening part for the support 4 and its general plane is substantially perpendicular to the longitudinal axis of the support. In this construction, the stiffeners 8 are omitted and end portions 14 of the support 4 are bent over in such a way as substantially to close the support. It will be noted that the annular stiffening groove 13 which is located between the tine holder and the axis of rotation that is afforded by the corresponding shaft 2 could, as an alternative, be located at the opposite side of the tine holder from said shaft 2. Moreover, a construction could be employed in which the stiffening grooves 13 are provided at both sides of the tine holder.

FIGS. 6 and 7 of the drawings illustrate a construction in which a tubular tine support 15 is used which is also formed, adjacent its opposite ends, with the lower hole 6 and upper hole 7. However, in this case, upper and lower clamping brackets 16 embrace the tine holders throughout substantially 180° each. The brackets 16 are formed with tapered holes in register with the holes 6 and 7 and with crescent-shaped (see FIG. 7) flanges 17 at the edges of the brackets which are nearest to, and furthest remote from, the corresponding shaft 2. The flanges 17 are thus contained in planes which are substantially perpendicular to the longitudinal axis of the support 15. With this construction, the brackets 16 provide support for the upper fastening portion of the tine 3 externally of the tine support 15 itself and are constructed and arranged in such a way that over-tightening of the nut 11 will not normally cause permanent deformation of the support 15 because the two brackets 16 will come into opposed abutting contact with one another before such a condition is reached. The provision of the flanges 17 at opposite sides of the tine holder, with respect to the longitudinal axis of the support 15, renders the provision of the stiffeners 8 and/or grooves 13 generally unnecessary.

FIG. 8 illustrates a construction in which a separate cylindrical tine holder 15A is fastened to the end of a tubular support 16A. The fastening is afforded by seam welds 19 which are located at both the top and the bottom of the tine holder 15A so as to extend substantially perpendicularly transverse to the longitudinal axis of the support 16A at one side of the tine holder 15A. The tine holder 15A itself is formed with a lower hole 17A and an upper hole 18 that co-operate with the collar 9 and the nut 11 in the same manner as has already been described with respect to the holes 6 and 7, that is to say, the edge region surrounding the hole 17A exhibits trapezoidal surfaces that co-operate with those of the collar 9 to prevent the tine 3 from being turned in its holder while the edge region that surrounds the hole 18 is of truly curved conical formation to co-operate clampingly with the nut 11.

FIG. 9 illustrates a construction in which a support 20 is afforded by two co-operating substantially symmetrical portions 21 and 22 that are rigidly superimposed upon one another by welding. With this construction, the two portions 21 and 22 can be formed from elongated sheet material by bending. An upper hole 24 and a lower hole 25 are again provided for co-operation with the fastening portion of the tine 3 and the two portions 21 and 22 are not, of course, truly symmetrical at these points as the margins of the holes are shaped to co-operate with the conical nut 11 and the trapezoidal flats of the collar 9 respectively. End regions 23 of the two portions 21 and 22 that are located beyond the tine holder from the axis of rotation of the soil working member are bent over towards one another and are secured to one another by welding to close, or substantially to close, the end of the support 20. The two portions 21 and 22 are formed, at the side of the tine holder remote from the end regions 23, with groove-like deformations 26, these deformations 26 being in close proximity (as hereinbefore defined) to the holes 24 and 25. This construction enables both the lower (21) and (22) portions of a tine support (20) to be manufactured simply and economically from two elongated lengths of sheet material, the finished support 20 having sufficient rigidity to hold the tines 3 without difficulty. Further groove-like deformations 26 or other deformations may be provided to increase the rigidity of the support 20 should that be required.

FIG. 10 diagrammatically illustrates the manufacture of, for example, the tubular tine support of circular cross-section that is illustrated in FIG. 5. Firstly, an upper circular hole (7) is punched at the top of the support near one end thereof and a lower square hole (6) in vertical register therewith. A pin 26A is then entered vertically through the aligned holes, said pin 26A having a round head 27 at its top that tapers conically in a downward direction. After the pin 26A has been inserted downwardly through the two holes, an upwardly tapering angular ring 29 exhibiting relatively inclined flat trapezoidal surfaces that are preferably four in number is slid upwardly on to the lower end of the pin 27 after which the head 27 and ring 29 are pressed towards one another to give matching surface shapes to the margins of the two holes. When the pressing operation is complete, a small transverse pin 28 is entered through the pin 26A beneath the ring 29 to maintain said pin 26A and said ring in the positions shown in FIG. 10. The stiffening part that is afforded by the annular groove 13 or other deformation is then formed and this can be conveniently done by employing pressing wheels 30 as shown in FIG. 10. Further pressing wheels 30 can, of course, be used if an additional groove 13 or the like is to be formed at the side of the tine holder which is remote from the axis of rotation of the soil working member 1 as well as at the side thereof which is nearest to said axis of rotation. If required, the end portions 14 of the support are bent over inwardly towards one another. The pin 26A is then removed after withdrawing the small transverse pin 28.

By using the constructions which have been described, tines can be mounted in their appointed positions without the employment of supports that are of very high intrinsic rigidity and thus of relatively high cost. The holes, such as 6 and 7, can be punched quite cheaply and a degree of rigidity that is sufficient for the supports can be obtained simply and with a minimum of material by providing either at one side, or at both sides, of each tine holding region a stiffener, deformation or the like that is located in close proximity (as hereinbefore defined) to the tine holder and that extends substantially perpendicularly transverse to the longitudinal axis of the corresponding tine support. As previously mentioned, it is preferred that each stiffener 8, deformation 26 or the like should be spaced from the nearest point of the corresponding tine holder by a distance of not more than five millimeters and each stiffener 8, deformation 26 or the like should preferably have an effective stiffening extent which is not less in magnitude than the radius of the corresponding tine support 4. In the case of a tine support having an oval, angular or other cross-section, the radius which has just been mentioned is considered to be the radius of a circle which, in cross-section, circumscribes the maximum diameter of such a support.

FIGS. 11 and 12 of the drawings illustrate a tine support 33 carrying tines 31 whose lower soil working portions 32 are of square or other angular cross-section and taper gently but progressively downwards toward their free ends or tips. The illustrated support 33 is forged integrally with a central shaft 34 that affords the axis of rotation of the whole soil working member, the free ends of the substantially horizontal support 33 being provided with substantially vertical cylindrical tine holders 35. The holders 35 are integral with the support 33 and shaft 34 and their longitudinal axes are parallel, or substantially parallel, to the axis of rotation afforded by the shaft 34, this latter upright axis normally being vertically or substantially vertically disposed. The top of each holder 35 is formed with a downwardly tapering conical surface 36 and the bottom thereof is formed with an upwardly tapering conical surface 37. The imaginary apices of the two conical surfaces that have just been mentioned are both located inside the corresponding holder 35 and the angle of conicity α (see FIG. 14) is preferably, in each case, substantially 90°. The lower conical surface 37 is surrounded, at its mouth, by four relatively inclined flats 38 while the upper conical surface 36 is formed with eight recesses 39 that are equally spaced apart from one another around the longitudinal axis of the holder 35 in the manner which can be seen best in FIG. 13 of the drawings. Each holder 35 should have a vertical length of not less than fifty millimetres and it is preferred that its magnitude should be substantially sixty millimetres. Each tine 31 is formed with a fastening collar 41 of conical curvature that will co-operate with a corresponding one of the conical surfaces 37. The tine 31 is prevented from turning in its holder 35 by virtue of the co-operation of flat portions of the angular profile of the soil working portion 32 of the tine that are located immediately beneath the collar 41 with the flats 38 of the tine holder 35. Each tine 31 has a screw-threaded portion 40 at its upper end which portion projects a short distance above the corresponding holder 35 when the tine 31 is in its appointed position. A nut 42 having a downwardly directed conical surface co-operates with the screw-threaded portion 40 of the tine, said conical surface abutting against the conical surface 36 of the tine holder. The edges of the eight recesses 39 bear against the conical surface of the nut 42 when it is tightened and act to tend to prevent said nut from working loose.

FIGS. 15 and 16 of the drawings illustrate a tine support 43 formed from two portions 44 and 45 of metallic sheet material. These portions 44 and 45 are profiled by punching and each of them defines, at each end, a corresponding portion 46 of a cylindrical tine holder 47. The upper portion 44 and lower portion 45 of the support 43 have abutting substantially horizontal edges 48 which are fastened to one another, for example, by welding. The holders 47 comprise upper conical surfaces 36 and lower conical surfaces 37 that are arranged to co-operate with the same tines 31 and their fastening nuts 42 that have already been described. However, in this case, a shaft 49 which affords the axis of rotation of the whole soil working member is entered through holes in the upper and lower portions 44 and 45 of the support 43 and is secured to the margins of those holes by welding.

FIGS. 17 and 18 of the drawings illustrate a construction in which substantially vertically disposed cylindrical tine holders 51 are welded or otherwise secured to the opposite ends of a hollow support 50. Each holder 51 has an axial length which is not less than fifty millimeters and which it is preferred should be substantially sixty millimeters. The longitudinal axes of the two holders are substantially parallel to the axis of rotation which is afforded by a central shaft 52 which is again entered through holes in the support 50 and welded to the margins of those holes. It will be seen from the drawings that the upper and lower ends of the holders 51 are provided with conical surfaces 36 and 37 that correspond to those which have already been described and that said holders are arranged to receive tines 31 that are negerally similar to those that have already been described with reference to FIGS. 11 and 12 of the drawings.

FIG. 19 of the drawings shows a modification of the tine support construction of FIGS. 17 and 18 in which a hole is formed only in an uppermost region 54 of the support 50 and a central shaft 53 affording the axis of rotation of the soil working member is rigidly secured to a lowermost region of the support 50, internally of the latter, by stud welding. It will be noted from the drawings that, in all of the embodiments that have been described with reference to FIGS. 11 to 18, the upper fastening portion of each tine 31 just fits in its cooperating holder with only a minimum of clearance sufficient to allow relative movement solely during installation and removal.

FIGS. 20 and 21 of the drawings illustrate a construction in which a substantially horizontal support 55 is secured centrally to a vertical or substantially vertical shaft 56 affording the axis of rotation of the whole soil working member. The connection between the support 55 and the shaft 56 may be similar to that which has been described with reference to FIGS. 2 and 3 of the drawings. Each end of the support 55 carries a corresponding substantially vertically disposed tine holder 57 whose upper and lower ends are again shaped to define respectively downwardly and upwardly tapering conical surfaces whose angles of conicity are substantially 90°. The holders 57 receive the fastening portions 59 of corresponding tines 58. Each tine 58 also has a lower downwardly tapering soil working portion 61 whose longitudinal axis, as previously mentioned, makes an angle of substantially 8° with the longitudinal axis of the fastening portion 59. Each tine 58 has a collar 60 just above the integral junction between its fastening portion 59 and its soil working portion 61, said collar 60 having an upwardly directed conical surface shaped to co-operate with the internal conical surface at the bottom of the holder 57. An upper end of the fastening portion 59 is screw threaded and co-operates with a nut 62 having a downwardly directed conical surface that will abut against the internal conical surface at the top of the holder 57 when the nut is tightened. As can be seen in FIG. 21 of the drawings, the nut 62 may incorporate an insert designed to prevent the nut from working loose. Each tine 58 has two diametrically opposed projections 63 at, and just beneath, the level of its collar 60, said projections 63, whose lower surfaces are inclined to both the horizontal and the vertical, being received in corresponding recesses at the lower end of the holder 57. Once the fastening portion 59 of each tine 58 has been placed in its appointed position and has had the corresponding nut 62 applied thereto, the co-operation of the projections 63 and recesses at the foot of the tine holder 57 prevents that tine from turning angularly in the holder. As previously discussed, the nut 62 can be loosened to allow the tine 58 to be turned through 180° in the holder 57 so that the soil working portion 61 of the tine can "lead" rather than "trail" with respect to the intended direction of rotation of the whole soil working member. The rigidity of the connections between the holders 57 and the supports 55 is strengthened, in this embodiment, by the provision of stiffening ridges 64.

The various constructions which have been described provide a firm and reliable fastening of tines to supports and also a rigid and reliable fastening of the supports themselves to shafts affording the axes of rotation of the soil working members.

Whilst various features of the tine fastenings and tine support fastenings that have been described and/or that are illustrated in the accompanying drawings will be set forth in the appended claims as inventive features, it is to be noted that the invention is not limited to those features and that it encompasses all of the parts that have been described and/or illustrated both individually and in various combinations.

What we claim is:

1. A cultivator tine mounting comprising an elongated support, said support being rotatable about an upwardly extending axis of rotation and having tine holder means adjacent at least one end of said support, said tine holder means being spaced from said axis and receiving an upper fastening portion of an upwardly extending tine, said tine holder means having parts that cooperate with said fastening portion, said parts being spaced apart from one another, an upper end of said fastening portion having securing means for retaining the tine in said holder means, said tine having a lower soil-working portion, and a junction including a collar having a conical surface interfitting with said holder means between its fastening portion and said soil-working portion, at least one integral projection on said tine adjacent said junction, said projection extending laterally beyond said collar and being received in a cooperating recess located at the lower side of said holder means to prevent angular displacement of said tine relative to the holder means.

2. A mounting as claimed to claim 1, wherein said tine has two diametrically opposed projections that are received in cooperating recesses of said holder means.

3. A mounting as claimed in claim 2, wherein at least a portion of each projection is located beneath said collar.

4. A mounting as claimed in claim 3, wherein each projection has an outwardly extending projection surface and said surface is inclined to both horizontal and vertical planes, when said tine is mounted in its operative position.

5. A mounting as claimed in claim 1, wherein said parts are located on the upper and lower sides of said holding means and the fastening portion has a threaded section, said securing means being threaded on said threaded section and said securing means engaging the uppermost of said parts.

6. A mounting as claimed in claim 1, wherein said support has two ends and each end has an integral tine holder means.

7. A mounting as claimed in claim 1, wherein said support has a center and said center is fastened to a shaft, said shaft comprising said axis of rotation, a longitudinal axis of said holder means being substantially parallel to said axis of rotation.

* * * * *